United States Patent [19]

Nauth et al.

[11] Patent Number: 5,716,811
[45] Date of Patent: Feb. 10, 1998

[54] STABILIZATION OF CULTURED SKIM MILK BACTERICIDAL ACTIVITY

[75] Inventors: K. Rajinder Nauth, Wheeling; Gerald William Urben, Palatine, both of Ill.

[73] Assignee: Kraft Foods, Inc., Northfield, Ill.

[21] Appl. No.: 551,982

[22] Filed: Nov. 2, 1995

Related U.S. Application Data

[63] Continuation of Ser. No. 389,546, Feb. 15, 1995, abandoned, which is a continuation of Ser. No. 97,686, Jul. 26, 1993, abandoned.

[51] Int. Cl.⁶ .................................................. C12P 21/00
[52] U.S. Cl. .................. 435/71.2; 435/253.4; 435/170; 426/61
[58] Field of Search .................. 426/61; 435/253.4, 435/170, 71.2

[56] References Cited

U.S. PATENT DOCUMENTS

| | | | |
|---|---|---|---|
| 3,420,742 | 1/1969 | Farr | 435/253.4 |
| 3,627,644 | 12/1971 | Okamoto et al. | 424/93 H |
| 5,171,591 | 12/1992 | Whiting | 426/43 |
| 5,186,962 | 2/1993 | Hutkins et al. | 426/61 |
| 5,217,950 | 6/1993 | Blakburn et al. | 514/2 |
| 5,232,849 | 8/1993 | Vedamuthu et al. | 435/252.9 |

FOREIGN PATENT DOCUMENTS

| | | | |
|---|---|---|---|
| WO 90/09106 | 8/1990 | European Pat. Off. | |
| 0446619 | 9/1991 | European Pat. Off. | 435/885 |
| 0505164 | 9/1992 | European Pat. Off. | |
| 22 41 421 | 9/1991 | United Kingdom | |

OTHER PUBLICATIONS

Kelra et al. (1992) Indian Food Dicker, 46(2), 5–15.
Kumer et al. (1992) MicroBiologie—Aliments–Nutrition, 10, 181–184.
Mahmoud et al. (1992) Egyptian J. Dairy Sci, 20, 191–200.
Jung et al. 1992 J. Dairy Science, 75, 387–393.
The Prokaryots, Second Edition, vol. II, Springer–Verlag, New York (Balows et al, Eds), 1482–1501, 1992.
*Food Technology*, vol. 44, No. 11, Nov., 1990 "Nisin and Its Uses as a Food Preservative" by J. Delves–Broughton, pp. 100–117.
Database WPI, Week 8113, Derwent Publications Ltd., London, GB; AN 81-22841D and SU-A 747 887 (Polt Stomatology) 18 Jul. 1980.
Database WPI, Week 8127, Derwent Publications Ltd., London, GB; AN 81-49057D and SU-A-771 152 (Polt Medi Stomatolo) 16, Oct. 1980.

*Primary Examiner*—Irene Marx
*Attorney, Agent, or Firm*—Fitch, Even, Tabin & Flannery

[57] ABSTRACT

The present invention is directed to a method for retaining the antimicrobial activity of the byproducts of growth of microorganisms during storage. In the method, a pasteurized low fat or skim milk substrate is provided. The substrate is inoculated with an *S. lactis* culture. The substrate is then fermented to cause growth of the culture and the release of metabolic byproducts, including nisin, from the culture. The fermented substrate is loaded into a container. The headspace of the container is then flushed with a quantity of an inert gas in excess of the amount required to displace all of the ambient air in the headspace. A small amount of a $CO_2$ producing chemical, such as calcium carbonate, sodium carbonate and sodium bicarbonate, is mixed into the fermented substrate. The $CO_2$ producing chemical has the effect of both stabilizing the antimicrobial activity of the cultured substrate and aiding in the release of nisin from the cells produced during fermentation of the substrate.

3 Claims, No Drawings

STABILIZATION OF CULTURED SKIM MILK BACTERICIDAL ACTIVITY

This application is a continuation of application Ser. No. 08/389,546 filed Feb. 15, 1995 now abandoned, which is a continuation of application Ser. No. 08/097,686 filed Jul. 26, 1993, now abandoned.

FIELD OF THE INVENTION

The present invention is directed to the stabilization of the bactericidal activity produced in skim milk during culturing of the skim milk with an S. lactis culture. More particularly, the present invention is directed to preserving the bactericidal activity of cultured skim milk during storage of the cultured skim milk.

BACKGROUND OF THE INVENTION

It is known that certain S. lactis cultures produce nisin as a byproduct of metabolism during fermentation of a skim milk or low fat milk substrate with the S. lactis culture. Nisin is an antimicrobial substance which has known food preservative use. Nisin has the property of inhibiting the growth of certain Gram-positive bacteria, but not Gram-negative bacteria or yeasts or molds. A further important property of nisin lies in the ability of nisin to prevent the outgrowth of germinated bacterial spores.

Skim milk cultured with S. lactis has an appearance and taste similar to cultured buttermilk. The taste differs somewhat since commercial cultured buttermilk is produced with a mixture of cultures including S. lactis, S. cremoris and L. cremoris. Fresh skim milk cultured with S. lactis can be used in food products to provide bactericidal protection. Such food products include high moisture cheese sauces and high moisture dressings, such as pourable dressings. The cultured skim milk generally has a nisin activity which is consistent and which is in the range of 1400–1600 nisin equivalent units/gram. The consistent nisin activity can be used to calculate precisely the level of nisin activity provided by the cultured skim milk. Since this level is generally in the range of about 6 to 10 ppm in the product, it is necessary that the nisin activity be stabilized and not undergo any diminution during storage.

A problem arises in that most plants which are suitable for producing food products containing cultured skim milk, such as a plant designed for producing salad dressings, do not have facilities for culturing skim milk in large quantities. Consequently, the skim milk is cultured at a plant suitable for that purpose and is then transported to the plant making the final product. The distances over which such transportation occur are often great and the cultured skim milk may require storage for several days prior to being used. During storage, the nisin activity may be reduced by more than 30%. Such reduction in nisin activity is detrimental to shelf life of any product in which the cultured skim milk is used. Reduced antimicrobial activity can lead to gas production and spoilage by lactobacilli which would cause a product withdrawal from the market.

Accordingly, it is the principal object of the present invention to provide a method for stabilizing the antimicrobial activity of cultured skim milk.

SUMMARY OF THE INVENTION

The present invention is directed to a method for retaining the antimicrobial activity of the byproducts of growth of microorganisms during storage. In the method, a pasteurized low fat or skim milk substrate is provided. The substrate is inoculated with an S. lactis culture. The substrate is then fermented to cause growth of the culture and the release of metabolic byproducts, including nisin, from the culture. The fermented substrate is loaded into a container. The headspace of the container is then flushed with a quantity of an inert gas in excess of the amount required to displace all of the ambient air in the headspace.

In an important embodiment of the invention, a means for producing carbon dioxide is mixed into the fermented substrate. The $CO_2$ producing chemical has the effect of both stabilizing the antimicrobial activity of the cultured substrate and aiding in the release of nisin from the cells produced during fermentation of the substrate.

DETAILED DESCRIPTION OF THE INVENTION

In the method of the invention, skim milk is first pasteurized and is then cooled to a fermentation temperature of about 30° C. The skim milk is inoculated with from about 1000 to 1 million cells/ml of an S. lactis culture. The inoculated skim milk is fermented over a period of about 14 to about 16 hours until a pH of about 4 is attained. The titratable acidity is in the range of from about 0.65 to about 185. The consistency of the skim milk after fermentation is that of a thick coagulum. The fermented skim milk remains pumpable and may be fluidized by mixing.

The skim milk is produced in batches which may vary from 2,000 to 15,000 gallons. Since the containers used to transport and store the fermented skim milk are of a uniform size, it is not practical to completely fill the containers for transportation. Complete filling of the containers would alleviate the problem of reduction of activity of nisin produced during fermentation. The level of nisin produced during fermentation is from about 1,400 to about 1,600 nisin equivalent units/gram. In accordance with the present invention, the headspace of the container holding the fermented skim milk is flushed with an inert gas, such as carbon dioxide or nitrogen. The inert gas is introduced into the container at a level in excess of that required to completely displace all of the air in the headspace. The excess of the inert gas is sufficient to reduce the oxygen content in the fermented substrate to less than about 4.5% at a level falling from about 6 to about 18 inches below the surface of the fermented substrate.

In an important embodiment of the invention, a means for producing carbon dioxide is mixed with the pasteurized skim milk prior to fermentation. The preferred $CO_2$ producing means is a chemical such as calcium carbonate, sodium carbonate and sodium bicarbonate. The $CO_2$ producing chemicals are added to the pasteurized skim milk at a level of from about 0.2% to about 1.0%. All percentages are by weight unless otherwise indicated. The addition of $CO_2$ producing chemicals has the result of increasing the nisin activity over a period of time. This is apparently due to the ability of the $CO_2$ produced in the fermented substrate to aid in releasing nisin from the interior of the cells through the cell wall. An alternative method for producing $CO_2$ in the pasteurized skim milk is to include a nisin resistant $CO_2$ producing microorganism in the skim milk during fermentation. Suitable microorganisms which metabolize citrate to $CO_2$, include L. cremoris and S. diacetilactis.

The following examples further illustrate various features of the invention, but are intended to in no way limit the scope of the invention as set forth in the appended claims.

EXAMPLE 1

Pasteurized skim milk was inoculated with an S. lactis culture at a level of 10,000 cells/ml. The inoculated skim milk was maintained at a temperature of 30° C. for a period of 15 hours to ferment the skim milk. The nisin activity at the end of the fermentation period was 1,600 nisin equivalent units/gram. Samples of the fermented skim milk were dispensed into 150 ml bottles and sealed. One sample was used to completely fill the container. A second sample was used to fill the container half full. A third sample was half filled and was flushed with carbon dioxide and sealed before agitation. A fourth sample was used to fill the container half full and was flushed with nitrogen to displace the air in the headspace. The samples were agitated at 150 rpm overnight in a cooler at 45° F. The full container had a nisin activity of 1,600 nisin activity units/gram at the end of this period. The container which was half-full and contained ambient air in the headspace had a nisin activity of 1,100 nisin equivalent units/gram at the end of this period. This corresponds to a 31.1% loss in activity. The container which was half-full and had carbon dioxide in the headspace had 1,500 nisin equivalent units/gram at the end of the period. This corresponds to a 6.2% loss in activity. The half-full container having nitrogen in the headspace also had an activity of 1,500 nisin equivalent units/gram at the end of the period.

EXAMPLE 2

100 ml of pasteurized skim milk was dispensed into sterile bottles. Calcium carbonate or sodium carbonate was added to the bottles at the concentrations indicated below in Table 1. Each bottle was then inoculated with 10,000 cells/ml of an *S. lactis* culture. The sample were then incubated overnight at 30°°C. The final solutions were tested for nisin activity, pH and titratable acidity after being inverted 20 times and after 30 minutes of settling. One sample of each concentration of calcium carbonate and sodium carbonate was divided into 50 ml flasks, some of which were full and some half-full. After overnight shaking in an orbital shaker at 40° F., the nisin activity, pH and titratable acidity were again tested. The results are set forth below in Table 1.

TABLE 1

| | After Shaking | | After 30 min. | | Overnight Shaking | |
|---|---|---|---|---|---|---|
| Solution | pH/TA | Activity (u/ml) | pH/TA | Activity (u/ml) | pH | Activity (u/ml) |
| Control | 4.48/.72 | 1600 | 4.43/.73 | 1700 | Full 4.12 | 1500 |
| Control | 4.49/.72 | 1600 | 4.46/.75 | 1600 | Half 4.24 | 1400 |
| .2% CaCO$_3$ | 4.72/.63 | 1600 | 4.79/.75 | 1600 | Full 4.44 | 1700 |

TABLE 1-continued

| | After Shaking | | After 30 min. | | Overnight Shaking | |
|---|---|---|---|---|---|---|
| Solution | pH/TA | Activity (u/ml) | pH/TA | Activity (u/ml) | pH | Activity (u/ml) |
| .2% CaCO$_3$ | 4.75/.69 | 1500 | 4.85/.73 | 1600 | Half 4.58 | 1700 |
| .5% CaCO$_3$ | 4.92/.65 | 1600 | 4.91/.73 | 1500 | Full 4.78 | 1900 |
| .5% CaCO$_3$ | 4.91/.65 | 1500 | 4.95/.70 | 1400 | Half 4.78 | 1900 |
| .75% CaCO$_3$ | 4.96/.67 | 1600 | 4.97/.73 | 1500 | Full 4.85 | 2000 |
| .75% CaCO$_3$ | 4.95/.57 | 1500 | 4.98/.69 | 1400 | Half 4.87 | 2000 |
| .2% Na$_2$CO$_3$ | 4.55/.76 | 1500 | 4.54/.80 | 1400 | Full 4.60 | 1500 |
| .2% Na$_2$CO$_3$ | 4.63/.77 | 1500 | 4.62/.78 | 1500 | Half 4.53 | 1700 |

From the results indicated in Table 1, it can be seen that the use of a carbon dioxide producing chemical can increase the level of nisin activity during fermentation and storage of a pasteurized skim milk substrate.

What is claimed is:

1. A method for retaining the nisin activity of fermented skim milk during storage until said fermented skim milk is used in preparing a food product, comprising providing a pasteurized skim milk substrate, inoculating said substrate with an *S. lactis* culture that produces nisin, fermenting said substrate at a temperature of about 30° C. to cause growth of said culture and the release of nisin from said culture to a level of nisin activity of from about 1400 to about 1600 nisin equivalent units/gram of skim milk, loading said substrate after fermentation into a container and introducing an inert gas selected from the group consisting of carbon dioxide and nitrogen into the headspace of said container in a quantity in excess of the amount required to displace all of the ambient air in said headspace, said inert gas being sufficient to reduce the oxygen level of said fermented substrate to less than about 4.5% at a depth of from about 6 to about 18 inches below the surface of said fermented substrate.

2. A method in accordance with claim 1 wherein after a 24-hour holding period said level of nisin activity does not decline by more than about 10%.

3. A method in accordance with claim 1 wherein a microorganism selected from the group consisting of *L. cremoris* and *S. diacetilactis* is mixed with said pasteurized skim milk substrate prior to inoculating said substrate with said *S. lactis* culture as a source of carbon dioxide.

* * * * *